United States Patent
Shie et al.

(10) Patent No.: US 7,729,674 B2
(45) Date of Patent: Jun. 1, 2010

(54) MULTIBAND OR MULTIMODE RECEIVER WITH SHARED BIAS CIRCUIT

(75) Inventors: Terrence John Shie, Cedar Rapids, IA (US); Russell David Wyse, Center Point, IA (US); Jinhua Zhong, Cadar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 692 days.

(21) Appl. No.: 11/651,949

(22) Filed: Jan. 9, 2007

(65) Prior Publication Data
US 2008/0166984 A1 Jul. 10, 2008

(51) Int. Cl.
*H04B 1/06* (2006.01)

(52) U.S. Cl. ..................... 455/201; 455/266

(58) Field of Classification Search ............... 455/78, 455/80, 550.1, 552.1, 553.1, 127.1, 127.2, 455/201, 266, 307, 343.1
See application file for complete search history.

(56) References Cited

U.S. PATENT DOCUMENTS

| | | | |
|---|---|---|---|
| 3,706,933 A | 12/1972 | Bidell et al. |
| 4,162,452 A | 7/1979 | Ash |
| 4,586,174 A | 4/1986 | Wong |
| 4,641,325 A | 2/1987 | Hughes |
| 4,758,802 A | 7/1988 | Jackson |
| 4,876,737 A | 10/1989 | Woodworth et al. |
| 5,055,800 A | 10/1991 | Black et al. |
| 5,111,162 A | 5/1992 | Hietala et al. |
| 5,134,615 A | 7/1992 | Freeburg et al. |
| 5,243,345 A | 9/1993 | Naus et al. |
| 5,321,851 A | 6/1994 | Sugayama et al. |
| 5,335,276 A | 8/1994 | Thompson et al. |
| 5,369,403 A | 11/1994 | Temes et al. |
| 5,371,783 A | 12/1994 | Rose et al. |
| 5,408,235 A | 4/1995 | Doyle et al. |
| 5,522,089 A | 5/1996 | Kikinis et al. |

(Continued)

FOREIGN PATENT DOCUMENTS

EP 0800267 8/1997

(Continued)

OTHER PUBLICATIONS

Isao Furukawa, et al., "A Synchronous, Step-Down From 3.6V to 1.0V, 1MHz PWM CMOS DC/DC Converter", Chou University, Tokyo, Japan, 20 pages.

(Continued)

*Primary Examiner*—Thanh C Le
(74) *Attorney, Agent, or Firm*—Weide & Miller, Ltd.

(57) ABSTRACT

A multi-band communication device with a front end antenna switch module and shared bias circuit is disclosed. Control inputs determine signal routing and amplifier biasing in response to the communication device's mode or band of operation. A received signal is routed to an active path, which corresponds to the band of the received signal. A received signal is selectively switched to one or more switch outputs, which connect to one or more filters matched to the band of the received signal. After filtering, the signal is directly provided to an active amplifier. An amplifier is activated by a bias signal received from a shared bias circuit. The shared bias circuit generates a bias signal which is selectively switched to an amplifier associated with an active path.

21 Claims, 5 Drawing Sheets

U.S. PATENT DOCUMENTS

| | | | |
|---|---|---|---|
| 5,528,682 A | 6/1996 | Cotreay | |
| 5,553,319 A | 9/1996 | Tanabakuchi | |
| 5,647,366 A | 7/1997 | Weng | |
| 5,661,434 A | 8/1997 | Brozovich et al. | |
| 5,675,334 A | 10/1997 | McCartney | |
| 5,742,246 A | 4/1998 | Kuo et al. | |
| 5,752,082 A | 5/1998 | Staples | |
| 5,760,722 A | 6/1998 | Harris et al. | |
| 5,809,432 A | 9/1998 | Yamashita | |
| 5,894,597 A | 4/1999 | Schwartz et al. | |
| 5,923,215 A | 7/1999 | Hans | |
| 5,924,044 A | 7/1999 | Vannatta et al. | |
| 5,963,872 A | 10/1999 | Stein | |
| 5,987,484 A | 11/1999 | Sherry et al. | |
| 6,052,158 A | 4/2000 | Nielsen | |
| 6,091,967 A | 7/2000 | Kruys et al. | |
| 6,130,579 A | 10/2000 | Iyer et al. | |
| 6,233,440 B1 | 5/2001 | Taylor | |
| 6,300,837 B1 | 10/2001 | Sowlati et al. | |
| 6,405,025 B1* | 6/2002 | Keski-Mattinen | 455/266 |
| 6,445,247 B1 | 9/2002 | Walker | |
| 6,466,768 B1 | 10/2002 | Agahi-Kesheh et al. | |
| 6,492,875 B2 | 12/2002 | Luo et al. | |
| 6,496,061 B1 | 12/2002 | Bloom et al. | |
| 6,584,304 B1 | 6/2003 | Thomsen et al. | |
| 6,631,273 B1 | 10/2003 | Eswein et al. | |
| 6,651,021 B2 | 11/2003 | Underbrink et al. | |
| 6,690,949 B1 | 2/2004 | Shamlou et al. | |
| 6,763,228 B2 | 7/2004 | Prentice | |
| 6,771,128 B1 | 8/2004 | Yamashita et al. | |
| 6,819,182 B2 | 11/2004 | Sibrai | |
| 6,873,208 B2 | 3/2005 | Shinjo et al. | |
| 7,085,587 B2* | 8/2006 | Oono et al. | 455/553.1 |
| 7,395,087 B2* | 7/2008 | Watanabe | 455/553.1 |
| 2004/0142674 A1 | 7/2004 | Kuiri | |
| 2005/0026647 A1* | 2/2005 | Li et al. | 455/552.1 |

FOREIGN PATENT DOCUMENTS

| | | |
|---|---|---|
| EP | 1 298 793 | 4/2003 |
| GB | 2235855 | 3/1991 |
| JP | 62 274906 | 11/1987 |
| JP | 02 149108 | 6/1990 |
| JP | 2005-142948 | 6/2005 |
| WO | WO 98/25339 | 6/1998 |
| WO | WO 00/14868 | 3/2000 |
| WO | WO 01/73941 | 10/2001 |
| WO | WO 03/050946 | 6/2003 |

OTHER PUBLICATIONS

Barry Arbetter, et al., "DC-DC Converter with Fast Transient Response and High Efficiency for Low-Voltage Microprocessor Loads", 1998 IEEE, pp. 156-162.

C.K. Lau, et al., "DSP Based Fuzzy Controlled Power Converter Operating in Both Continuous and Discontinuous Conduction Modes", 1996 IEEE, pp. 1530-1535.

A. Barrado, et al., "Fast Transient Response with Combined Linear-Non-Linear Control Applied to Buck Converters", 2002 IEEE, pp. 1587-1592.

K.D. Purton, et al., "Non-Linear Fuzzy Logic Control of a PWM Inverter with a Non-Linear Load", 2000 IEEE, pp. 229-234.

Jinwen Xiao, et al., "An Ultra-Low-Power Digitally-Controlled Buck Converter IC for Cellular Phone Applications", 2004 IEEE, pp. 383-391.

Tetsu Sakata, et al., "π/4 shift QPSK Digital Modulator LSIC for Personal Communication Terminals", NTT Radio Communications Systems Laboratories, PIMRC '94, IEEE, pp. 472-475.

Brown, M., "Practical Switching Power Supply Design," San Diego: Academic Press, Inc., pp. 9-15 (1990).

Brown, M., "Practical Switching Power Supply Design," San Diego: Academic Press, Inc., pp. 17-42 (1990).

Brown, M., "Practical Switching Power Supply Design," San Diego: Academic Press, Inc., pp. 43-65 (1990).

Brown, M., "Practical Switching Power Supply Design," San Diego: Academic Press, Inc., pp. 67-95 (1990).

Brown, M., "Practical Switching Power Supply Design," San Diego: Academic Press, Inc., pp. 199-233 (1990).

Candy, J., et al., "Oversampling Methods for A/D and D/A Conversion," Oversampling Delta-Sigma Data Converters—Theory, Design, and Simulation, New York: IEEE Press, pp. 1-25 (1992).

Raab, F., et al., "High-Efficiency Single-Sideband HF/VHF Transmitter Based on Envelope Elimination and Restoration," Radio Systems and Techniques' IEE Conference Publication No. 392, pp. 21-24 (Jul. 4-7, 1994).

* cited by examiner

MULTIBAND OR MULTIMODE RECEIVER WITH SHARED BIAS CIRCUIT

1. FIELD OF THE INVENTION

The invention relates to communication systems, and in particular to a multiple band communication receivers.

2. RELATED ART

It has become increasingly important to minimize the size, weight, complexity, and cost of various electronic devices, especially personal communication devices such as cellular telephones, personal pagers, cordless telephones, and the like. One way to reduce cost and complexity is to minimize the number of components and connections in the electronic device, or to perform multiple functions using the same components. This is especially true for modern cellular communication, where several different communication standards are employed worldwide, and cellular telephones with the flexibility to operate under multiple communications standards are highly desirable from a consumer and manufacturing perspective.

One example communication standard, the Global System for Mobile (GSM) communication standard is a world-wide mode of digital cellular communication operating over up to four different frequency bands. Other bands include EGSM, which operates in the 900 MHz frequency band and DCS, which operates in the 1800 MHz frequency band. Other bands include PCS, operating in the 1900 MHz band and GSM850, operating in the 800 MHz frequency band.

GSM is not the only standard for cellular communication. CDMA is another mode of digital cellular communication operating in either the 900 or 1900 MHz frequency band. CDMA has been one of the most widely used modes of cellular communication in the United States, and is the most widely used mode of cellular communication in Korea. It should be noted that other communication standards also exist around the world.

With improved voice and data communications and expanding business markets, a multiband communication capable of operating in many different bands or countries is of interest. Multi-mode, multi-band cellular telephones with shared functionality capable of operating under all of these standards afford consumers widespread applicability greater capability and allows manufacturers to benefit from the cost-efficiency of a common design.

However, multi-mode or multi-band communication devices present a number of design challenges. One such design challenge is that the receiver must be capable of accommodating incoming signals in multiple different bands, i.e. at different frequencies. By way of example, in a quad band communication device, it is desired that a single antenna receive and provide a signal, which may be in any of multiple different bands, to the receiver amplifier stages, such as a low noise amplifier associated with that band. Furthermore, the frequencies and parameters employed by each band and mode may require different filters and isolation for the receive function of each band.

Prior art solutions to such challenges include utilizing an antenna switch to direct the incoming signal to an appropriate filter for isolation, and then to another switch which directs the signal to a shared amplifier. FIG. 1 illustrates an example prior art embodiment. As shown, an antenna 104 is configured to receive an incoming signal. The antennal 104 may also be configured to transmit. The antenna 104 connects to an antenna switch 108 which is configured to selectively route the incoming signal to a filter 112 matched to the frequency band of the incoming signal. In this embodiment the filters 112A and 112B pass only the desired frequency band to a low noise amplifier path (LNA) switch 116. The LNA path switch 116 routes the signal to a low noise amplifier (LNA) 124, which is biased by the bias circuit 120. The received amplified signal is provided on output 128.

This prior art solution suffers from several drawbacks. First, the LNA path switch 116 is located on a die which is separate from the low noise amplifier 124. Use of multiple dies undesirably increases the cost of the overall system. In addition, use of a separate die for the LNA path switch also increases the space requirements of the receiver system, which prevented size reductions often demanded by consumers. The additional die also increased complexity by requiring additional bonding pads for die interconnections with other dies. In some instances, such complexity may lead to failure or other design issues which would preferably be avoided.

In addition, use of a switch 116 as shown in FIG. 1 between the filters 112 and amplifier 124 results in unwanted signal attenuation. In general, even high quality/priced switches such as used in prior art designs result in signal loss, which in turn decreases the signal to noise ratio (SNR). SNR is a measure of a receiver's capability and use of the switch 116 may decrease the SNR to an unacceptable level.

As a result of the design challenge associated with producing communication devices of minimal size, weight, complexity, and cost while maximizing performance, there exists a need for an improved interface between the amplifier stages and antenna in a multiband communication device.

SUMMARY

To overcome the drawbacks of the prior art and provide additional benefits as described herein a multiband receiver with a shared bias circuit is disclosed. In one embodiment, the receiver comprises an antenna configured to receive and convert a wireless signal to a received signal and one or more antenna switches configured to route the received signal to one or more filters. The one or more antenna switches are responsive to an antenna switch control signal. Also part of this receiver are one or more filters configured to process the received signal to create a filtered received signal and two or more amplifiers, biased with an amplifier bias signal from a shared bias circuit. The two or more amplifiers may be configured to selectively amplify the filtered received signal to create an amplified signal. A shared bias circuit creates the bias signal. The shared bias circuit comprises a bias circuit configured to generate an amplifier bias signal and a bias switch network configured to selectively provide the amplifier bias signal to only one of the two or more amplifiers. The bias switch network is responsive to a bias switch control signal.

In one embodiment, the receiver further comprising a processor configured to generate the antenna switch control signal and the bias switch control signal. In one embodiment the bias switch network and the amplifiers are located on the same die. It is contemplated that the antenna switch control signal and the bias switch control signal may be generated in response to a frequency band of the wireless signal. In one variation, the one or more antenna switches selectively route the received signal to a filter tailored to the frequency band of the received signal. This receiver may also comprises a shared tuning circuit configured to cancel unwanted low frequency artifacts. In addition, the shared tuning circuit may be connected to the amplifier through the bias switch network.

Also disclosed herein is a shared bias system for use in a receiver. In one configuration, the system comprises a shared bias circuit configured to generate a bias signal for two or more amplifiers and one or more bias switches configured to selectively connect the bias signal to an amplifier. The amplifier is often selected from a group of two or more amplifiers such that the one or more switches are controlled by one or more control signals. In addition, a controller is configured to generate the one or more control signals, responsive to a frequency band of a received signal or a band indicator signal.

In one variation, the bias circuit, the one or more bias switches, and the two or more amplifiers are on the same die. In one embodiment, the one or more bias switches are configured to provide the bias signal to only one of the two or more amplifiers. The controller may comprise a digital signal processor. In one configuration the system further comprises a filter associated with each amplifier, and the filter provides a received filtered signal directly to the amplifier. It is contemplated that the shared bias system is configured for use in wireless receiver. In one embodiment the system further comprising a shared tuning circuit configured to create a low frequency cancellation signal, wherein the low frequency cancellation signal is selectively connect to an amplifier through the one or more bias switches.

Also disclosed herein is a method for receiving and amplifying an incoming signal in a receiver. This method comprises determining a mode of operation such that in response to determining the mode of operation, a path is selected from two or more paths within the receiver is activated. The method also receives a signal and selectively routes the received signal to an active path. The method then filters the received signal with an active path filter to create a filtered signal and generates a bias signal. The method also controls one or more switches to selectively connect the bias signal to only an active path amplifier and then amplifies the filtered signal with an active path amplifier.

In one variation the bias signal is generated by a shared bias circuit which is shared, through the one or more switches, with two or more amplifiers. In addition, during operation the received signal and filtered signal may travel within two or fewer die. In one embodiment the mode of operation is determined by a frequency band of the received signal. The step of selectively routing the received signal to an active path may be performed by an antenna switch. The communication device in which this method may be performed may be a tri-band wireless communication device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art and provide additional benefits as described below, a multiband antenna switch module is disclosed that is configured with a reduced number of switches or control inputs. This in turn reduces the complexity and cost of the antenna switch module. Additional details and benefits are discussed below. The term multiband and multimode are often used interchangeable in the communications industry and herein.

Figure 2:
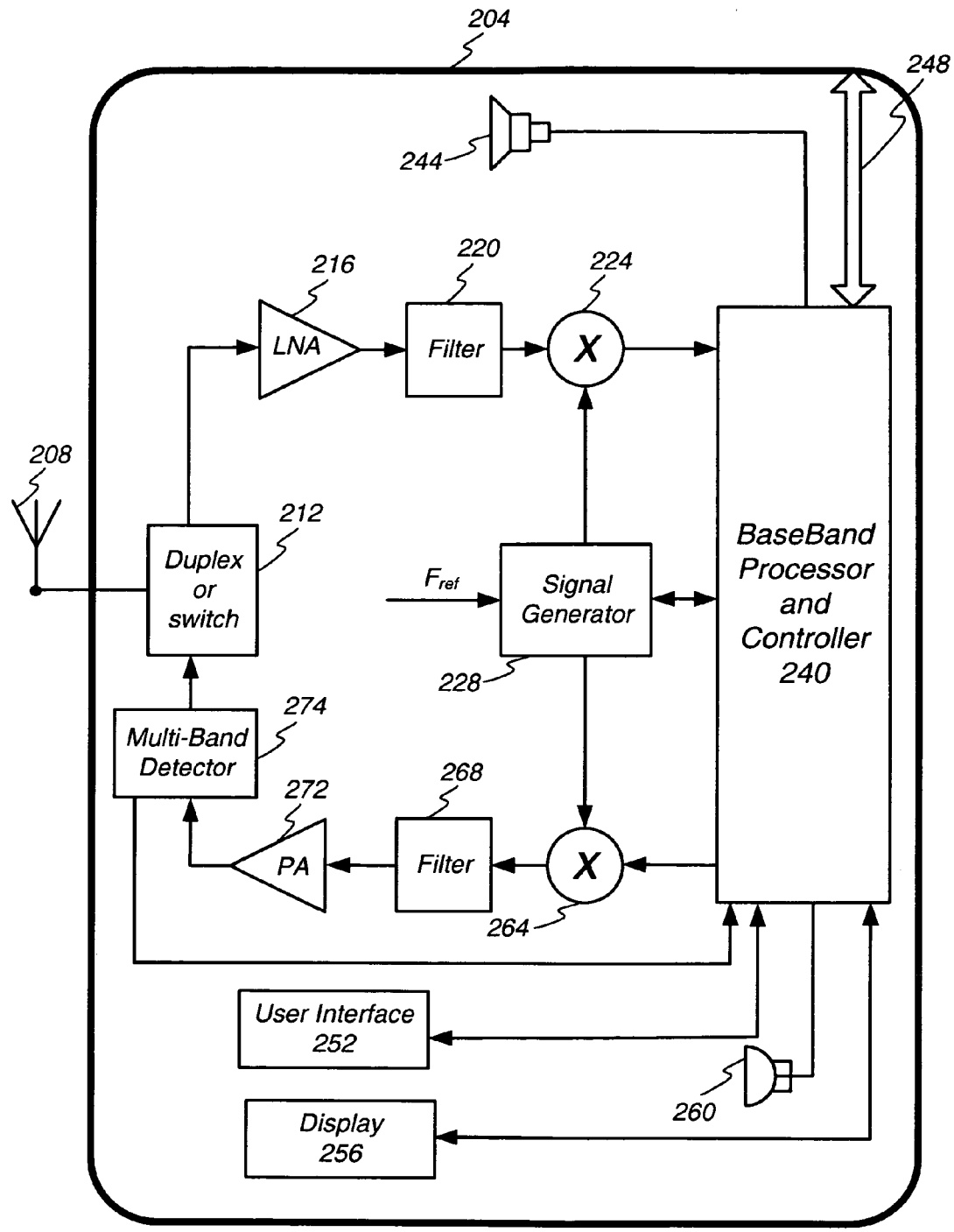
FIG. 2 illustrates an example environment of use of the antenna switch module described herein.

Before turning to the various embodiments of the multiband antenna switch module, an example environment of operation is provided. This is but one example environment and as such, it is contemplated that the method and apparatus described herein may find application in numerous other environments. FIG. 2 illustrates a block diagram of a first example environment of use of the invention. The example environment shown in FIG. 2 comprises a mobile communication device. It is contemplated that the invention may find use and provide benefit in numerous other environments both in the communication field and other fields of use.

The mobile communication device shown in FIG. 2 comprises an outer housing 204 configured to protect and selectively enclose the internal electronic apparatus. An antenna 208 receives incoming signals and transmits outgoing signals. The antenna 208 may be located inside or outside of the housing 204. An antenna switch module 212 connects to the antenna 208 to route incoming signals to a receiver apparatus, shown as the upper path from the antenna switch module and route outgoing signals to the antenna.

The antenna switch module 212 connects to a receiver apparatus to thereby route received signals to a low noise amplifier (LNA) 216 that is configured to increase a signal's power level for a particular frequency band to a level appropriate for processing by subsequent apparatus. The LNA 216 output connects to a filter 220 which may be configured to perform additional filtering or processing, such as for example band pass filtering or processing to mitigate the effects of the wireless channel.

After filtering, a mixer 224, also known as a down-converter, processes the received signal in conjunction with a signal from a signal generator 228. The mixer 224 may be configured to extract a baseband signal by multiplying the received signal at a carrier frequency with a signal from the signal generator 228 that is also at the carrier frequency. As is well understood, the mixer 224 outputs the desired carrier signal.

The output from the mixer 224 feeds into a baseband processor and controller 140 configured to receive and process the incoming baseband signal. In one embodiment, the baseband processor and controller 240 converts the incoming signal to a digital format, processes the digital signal, and then creates an analog signal which is provided to a speaker 244. Alternatively the digital signal may be provided directly to a data port 248. In this embodiment, the baseband processor and controller 240 is in communication with the signal generator 228 to synchronize operation. The controller 240 may also provide one or more control signals to the antenna switch module 212.

The baseband processor and controller 240 may also configured to communicate data to and from a user interface 252, such as with one or more keys or buttons, and a display 256 configured to display text, graphics, or other information to a user.

To perform transmission of outgoing signals, the baseband processor and controller 240 may receive a signal from a microphone 260 or digital data from the data port 248. Upon receipt of an outgoing signal, the baseband processor and controller 240 processes the outgoing information to a baseband signal and output this baseband signal to a mixer 264, which may also be referred to as an up-converter. The mixer 264 multiplies the baseband signal with an input from the signal generator 228 at the desired carrier frequency. The resulting outgoing signal comprises the baseband signal modulated to the carrier frequency and is ready for filtering and processing by the filter 268 and then amplification by a power amplifier 272 to a power level suitable for transmission by the antenna 208 after passing through the antenna switch module 212.

In this embodiment a multiband detector 274 receives the output from amplifier 272. The multiband detector 274 may monitor one or more aspects of the outgoing signal, such as amplitude or power level. In one embodiment, the detector 272 may provide a feedback or data signal to the controller 240 as shown. As discussed below in more detail, the detector 274 may monitor the amplitude of the outgoing signal, i.e. the signal being transmitted, and provide information regarding the amplitude to the controller 240.

Figure 3:
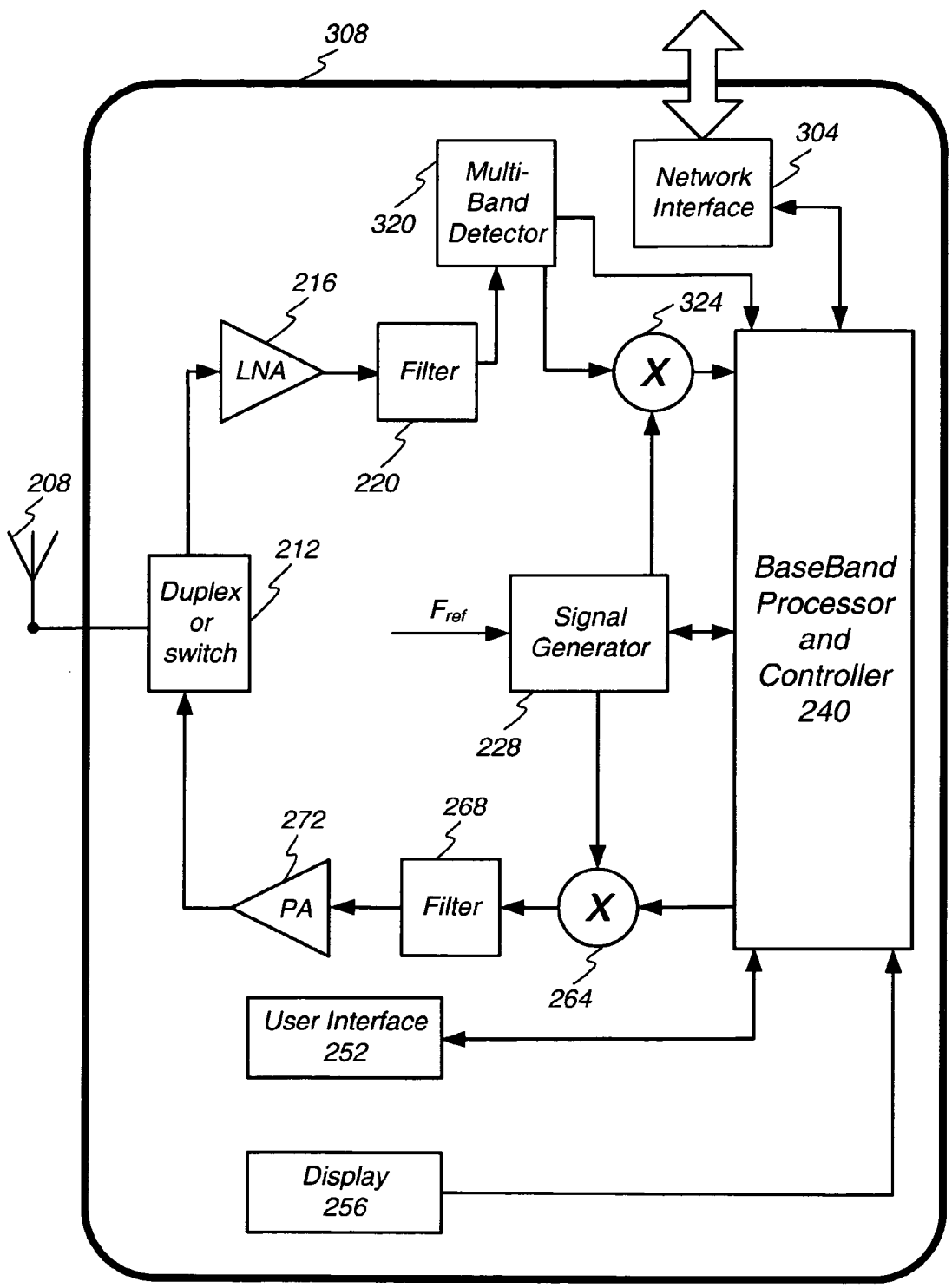
FIG. 3 illustrates a first example embodiment of a multiband antenna switch module.

FIG. 3 illustrates a block diagram of a second example environment of use of the invention. FIG. 3 shares numerous similarities with FIG. 1 and thus, wherein the aspects that differ from FIG. 3 are discussed in detail. The embodiment of FIG. 3 is directed to a base station 308 or non-mobile communication device configured to communicate with one or more other communication devices. In this configuration, which may represent a base station communication system 308, the base band processor and controller 240 communicate with a network interface 304. The network interface 304 may be configured to receive one or more signals or packet-based-data from the processor and controller 240. The one or more signals or packet-based-data is output to a computer network, internet, PSTN, or other medium that interfaces with a telephone network, data network, or cellular communication system. When configured as a base station 408, the system shown in FIG. 3 facilitates completion of a mobile telephone call, such as a telephone call from a cell phone or to a land line. These calls are often completed via the network interface 304 of the base station 308.

Also shown in FIG. 3 is a multiband detector 320, which in this embodiment is configured to receive the output of the filter 220. The detector 320 passes the incoming signal to the mixer 224, while also providing information or data regarding one or more aspects of the incoming signal to the controller 240.

Figure 4:
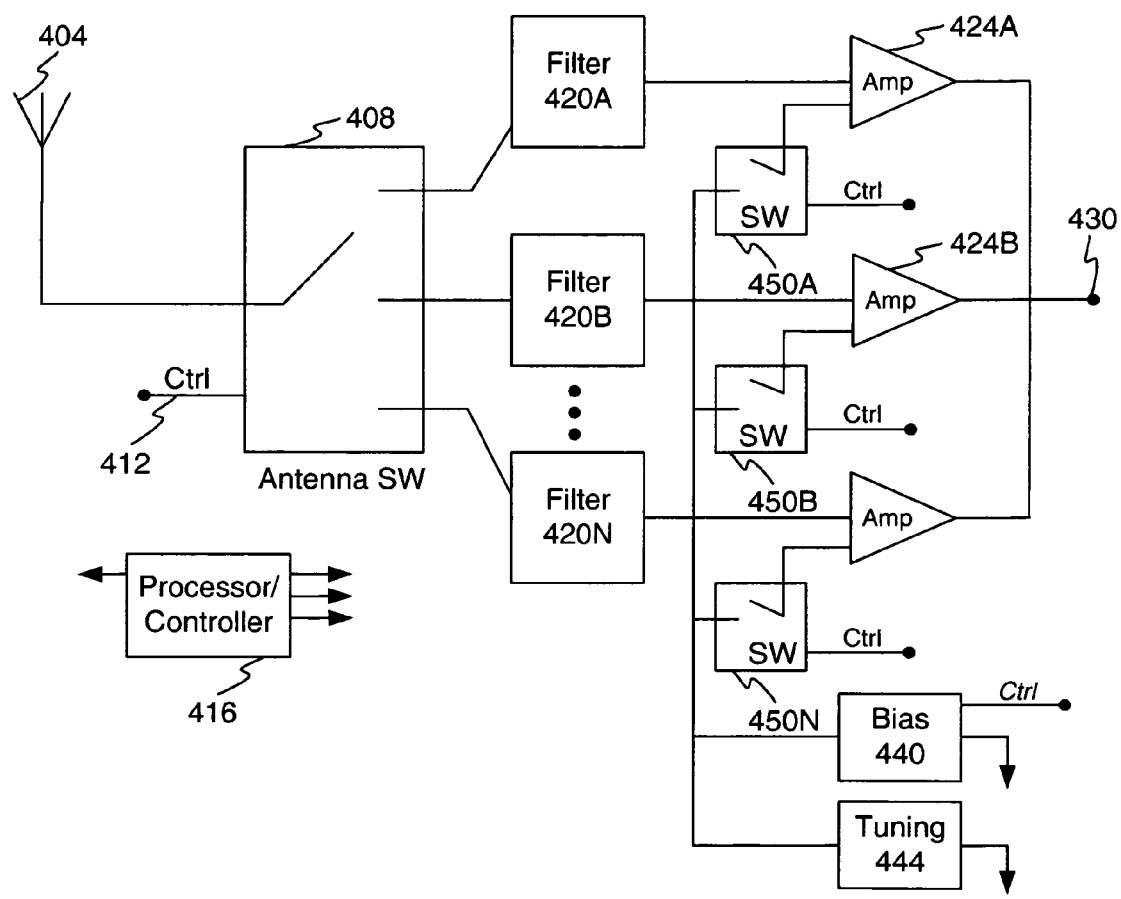
FIG. 4 illustrates a block diagram of an example embodiment of a multiplexed receiver.

FIG. 4 illustrates a block diagram of an example embodiment of a multiplexed receiver. This is but one example embodiment and as such, it is contemplated that one of ordinary skill in the art may create different embodiments, which however do not depart from the claims which follow. In this example embodiment, an antenna 404 is configured to receive an incoming signal. The antenna 404 connects to an antenna switch 408 as shown. The antenna switch 408, responsive to a control input 412, selectively connects the incoming signal to one of two or more different switch outputs. It is contemplated that one or more processing elements, not shown, may be located between the antenna 404 and the antenna switch 408, such as but not limited to a diplexer.

Providing the control input 412 to the antenna switch 408 is a processor 416. The processor 416 may comprise any type control device capable of generating one or more control outputs to the elements as discussed herein. It is contemplated that the processor 416 may comprises a digital signal processor (DSP), ASIC, control logic, microprocessor, ARM, state machine, or any other element(s) capable of generating one or more control signals. The processor 416 generates control signal indicative of which frequency band the communication device is or will be operating.

The switch outputs from the switch 408 connect to filters 420A-420N, where N is any whole number. The switch 408, controlled by the control input 412, selectively outputs the incoming signal to a filter associated with a particular frequency band of the incoming signal. The filters 420 are configured to isolate the incoming signal and as such, each filter is tuned to the frequency band of its associated path, i.e. that of the incoming signal. The output of each filter 420 provides a filtered signal, isolated within the frequency band.

The output of each filter 420 is provided to an amplifier 424A-424N as shown. In this embodiment the amplifiers 424 comprise low noise amplifiers configure to amplify incoming signals received over a wireless channel. In other embodiments, other amplifiers may be utilized as would be understood by one of ordinary skill in the art. The output of the amplifiers 424 are joined at a common output node 430 although in other embodiments the output of each amplifier may be isolated from the other outputs.

Also shown in FIG. 4 is a shared biasing circuit 440 and shared tuning circuit 444. The shared biasing circuit 440 may be configured with a control input from the processor 416 to control one or more aspects of operation of the bias signal. The shared bias circuit 440 generates a bias value, such as a voltage, which is selectively provided to the active amplifier 424, via a switch 450A-450N. The switches 450 receive a control input from the processor 416 as shown, and are selectively open and closed, responsive to the control signal, to route the bias signal from the bias circuit to the appropriate amplifier 424, namely, the amplifier associated with the frequency band of the received signal. In one embodiment, only one amplifier is biased at a particular time to thereby reduce power consumption. This configuration does not use a switch between the filters 420 and the amplifiers 424, which thus, does not result in switch attenuation and noise introduction from the switch.

The shared tuning circuit 404 is also selectively connected to the active amplifier to provide amplifier tuning. In this configuration the shared tuning circuit 444 provides an improvement in the signal to noise ratio by shunting low frequency artifacts generated from the mixing or amplification to ground. In other embodiments other shared tuning circuits 444 may be enabled. In one configuration the tuning circuit comprises passive elements which may be shared or selectively tuned to match or cancel unwanted artifacts generated during the amplification/processing of the incoming signal in each particular frequency band. An additional or different switching system may be provided, similar to that shown, for the tuning circuit 444 instead of the shared switching system 450 as shown.

An output signal is provided on an output 430. The output signal comprises an amplified version of the received signal subject to the desired filtering.

Figure 1:
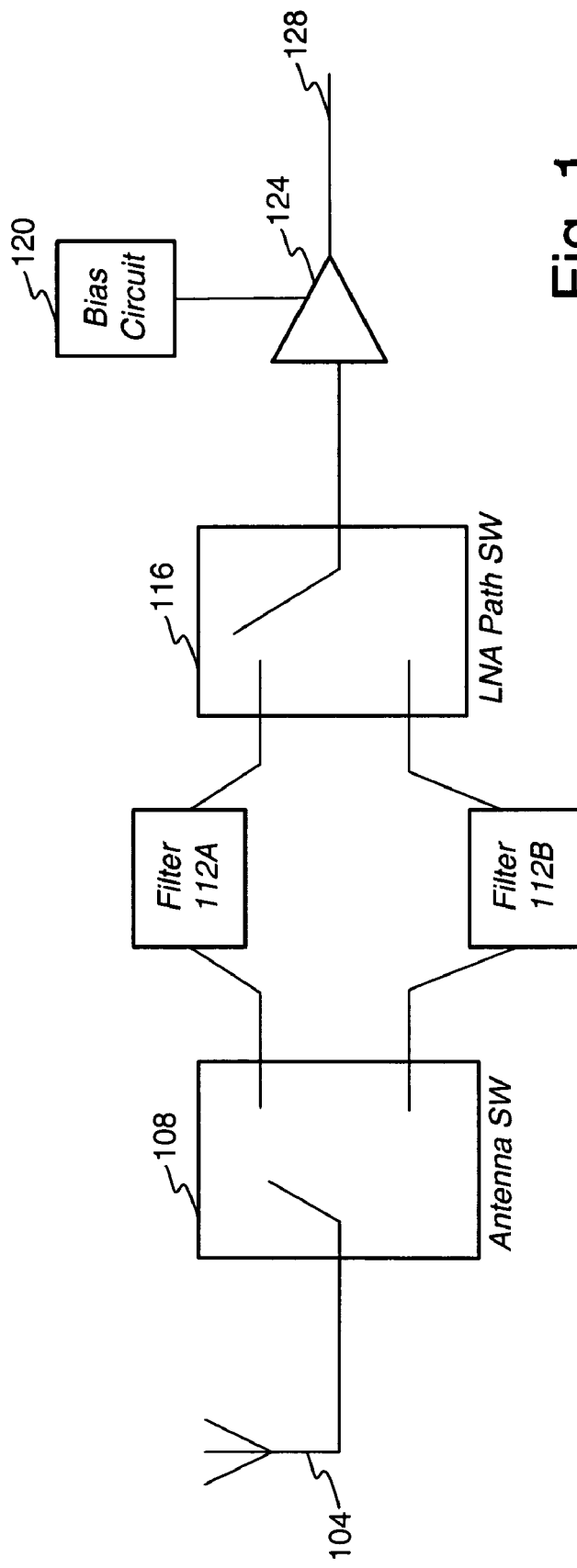
FIG. 1 illustrates a block diagram of a prior art design.
Figure 5:
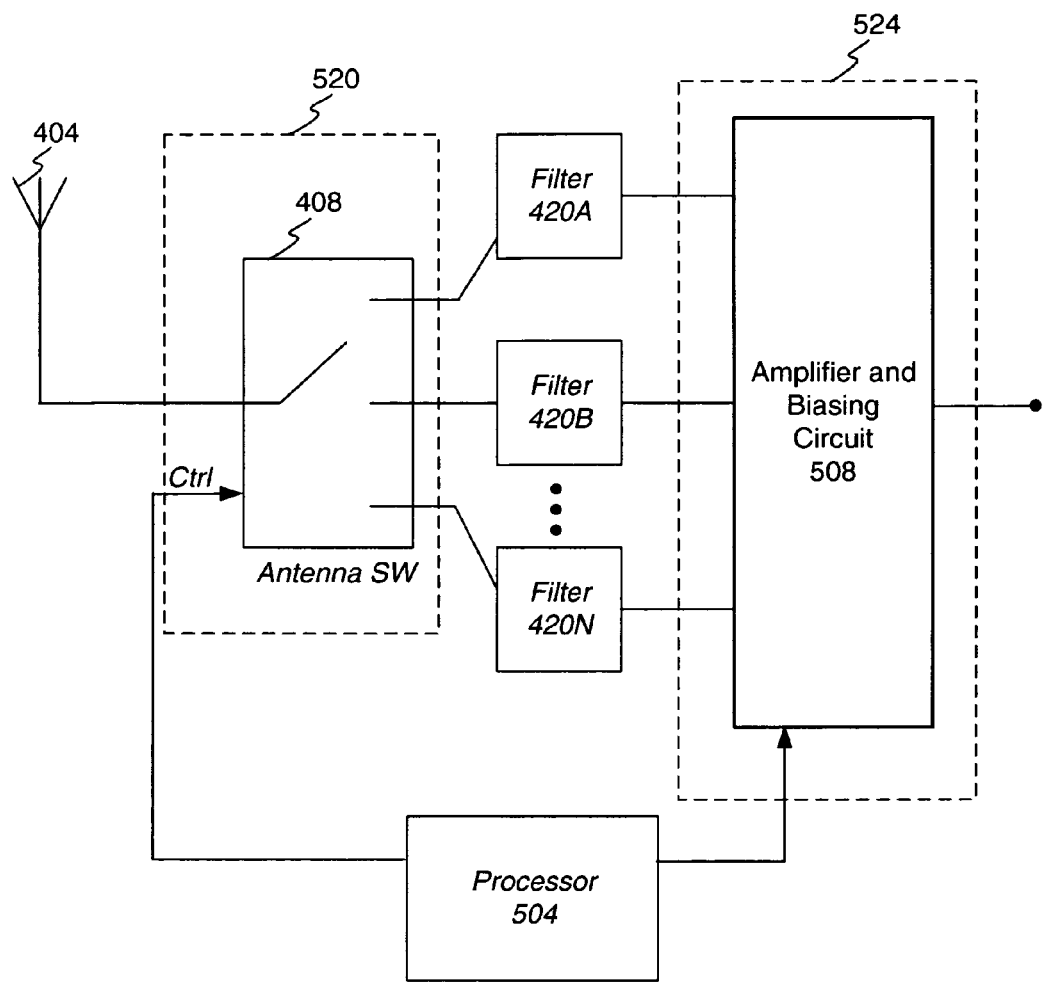
FIG. 5 illustrates a block diagram showing an example embodiment in relation to the number of die utilized.

FIG. 5 illustrates a block diagram showing an example embodiment in relation to the number of die utilized. It is contemplated that as compared to prior art solutions, the method and apparatus described herein may utilize a reduced number of die. As compared to FIG. 4, similar elements are labeled with identical reference numbers. In this embodiment, the processor 504 is shown as connecting to the antenna switch 408 and an amplifier and biasing circuit 508. In this embodiment the antenna switch 408 is configured on a first die 520 while the amplifier and biasing circuit 508 is configured on a second die 524. In this embodiment the filters 420 are discrete elements, but in other embodiment may be configured on or part of either the first die or the second die. As a benefit to this configuration and the configuration of FIG. 4, a reduced number of die are required as compare to the system of FIG. 1. In FIG. 1, elements 108, 116, and 124 all required separate die thereby brining the total die count to 3. By reducing the number die required, the size, cost and complexity are desirably reduced.

In operation and reference to FIG. 4, the processor 416 detects the frequency band of the incoming signal or mode the communication device is currently operating. This may be detected by analyzing one or more aspects of the incoming signal, from a control signal (band indicator signal) from a base station, or by user input. Responsive to this detection, the processor 416 provides control signal to the antenna switch 408 and biasing switches 450. A control signal may also be provided to the biasing circuit 440 and/or the tuning circuit 444. It is contemplated that the communication device will thus be configured for receiving and processing signals in a frequency band of an incoming signal.

The control signal to the antenna switch 408 forces the antenna switch to route the incoming signal to a filter 420 which is matched to the particular frequency band of the incoming signal. Likewise, the control signal(s) provided to the switches 450 control the switch to bias the appropriate amplifier 424, namely the amplifier associated with the signal path for the frequency band of the signal. It is contemplated that amplifiers not in use are not biases to thereby reduce power consumption. The path to which the signal is routed by the antenna switch 408 may be referred to as the active path while the other paths, which are not in use, are referred to as inactive.

Thereafter the incoming signal is routed through the antenna switch 408 to the proper a filter matched to the frequency band of the received signal, and then to the amplifier 424. Due to the selective switching of switches 450A-450N, only the amplifier in the active path is biased and consuming power. The other amplifiers are inactive and hence not contributing unwanted noise to the output 430 or drawing power. In addition, this design avoids use of a switch between the filters 520 and the amplifiers 424.

The active amplifier receives the incoming signal and provides the desired level of amplification. The output node 430 receives the output signal from the amplifier 424 and the output signal may be forwarded to additional circuitry for subsequent processing.

The switches 450 also connect the shared tuning circuit 444 to the active path. In one example method of operation, the shared tuning circuit 144 creates a low frequency mixing filter, which reduces the mixing effect of the beat note. In the case of a 900 MHz and 901 MHz mixing circuit, the mixing process may create an unwanted 1 MHz signal artifact. The tuning circuit shorts this unwanted signal artifact to reduce the artifact signal from being re-amplified. In one configuration the shared tuning circuit may provide a 5-7 dB improvement.

As benefits to this mode of operation, only the active path amplifier is enabled and a shared biasing circuit may be utilized for all of the amplifiers 424 to minimize circuitry. In addition, the output of the filter 420 is directly connected to the amplifiers 424 thereby avoiding use and passage through an amplifier switch as shown in FIG. 1. This configuration advantageously reduces complexity and size by eliminating a separate die on which the antenna switches were previously located. In addition, the antenna switch was undesirably attenuated the incoming signal, which was already at a low power level. In addition, amplifier switches may introduce unwanted noise or signal distortion, which the configuration of FIGS. 2-5 avoid due to the shared biasing network with multiple amplifiers.

While various embodiments of the invention have been described, it will be apparent to those of ordinary skill in the art that many more embodiments and implementations are possible that are within the scope of this invention. In addition, it is contemplated that the various features and elements may be claimed or configured for use individually, or in any combination.

What is claimed is:

1. A multiband receiver with a shared bias circuit comprising:
    an antenna configured to receive and convert a wireless signal to a received signal;
    one or more antenna switches configured to route the received signal to only one of one or more filters, wherein the one or more antenna switches are responsive to an antenna switch control signal;
    one or more filters configured to process the received signal to create a filtered received signal wherein the one or more filters are configures such that only one of the one or more filters receives and processes a received signal at a time;
    two or more amplifiers, biased with an amplifier bias signal from a shared bias circuit, the two or more amplifiers configured to selectively amplify the filtered received signal to create an amplified signal;
    a shared bias circuit comprising:
        a bias circuit configured to generate an amplifier bias signal;
        a bias switch network configured to selectively provide the amplifier bias signal to only one of the two or more amplifiers, wherein the bias switch network is responsive to a bias switch control signal.

2. The receiver of claim 1, further comprising a processor configured to generate the antenna switch control signal and the bias switch control signal.

3. The receiver of claim 1, wherein the bias switch network and the two or more amplifiers are located on the same die.

4. The receiver of claim 1, wherein the antenna switch control signal and the bias switch control signal are generated in response to a frequency band of the wireless signal.

5. The receiver of claim 1, wherein the one or more antenna switches selectively route the received signal to a filter tailored to the frequency band of the received signal.

6. The receiver of claim 1, further comprising a shared tuning circuit configured to cancel unwanted low frequency artifacts.

7. The receiver of claim 1, wherein the shared tuning circuit is connected to the amplifier through the bias switch network.

8. A shared bias system and signal path for use in a receiver comprising:
    two or more filters, wherein each filter is configured for a frequency band and only one filter receives and filters a signal at a time;
    two or more amplifiers, wherein of the two or more amplifiers only one amplifier receives a signal from a filter and amplifies a signal at a time;
    a shared bias circuit configured to generate a bias signal for the two or more amplifiers;
    one or more bias switches configured to selectively connect the bias signal to an amplifier selected from the two or more amplifiers, wherein the one or more switches are controlled by one or more control signals;

a controller configured to generate the one or more control signals responsive to the frequency band of a received signal or a band indicator signal.

9. The system of claim 8, wherein the bias circuit, one or more bias switches, and the two or more amplifiers are on the same die.

10. The system of claim 8, wherein the one or more bias switches are configured to provide the bias signal to only one of the two or more amplifiers.

11. The system of claim 8, wherein the controller comprises a digital signal processor.

12. The system of claim 8, further comprising a filter associated with each amplifier, and wherein the filter provides a received filtered signal directly to an amplifier.

13. The system of claim 8, wherein the shared bias system is configured for use in wireless receiver.

14. The system of claim 8, further comprising a shared tuning circuit configured to create a low frequency cancellation signal, wherein the low frequency cancellation signal is selectively connect to an amplifier through the one or more bias switches.

15. A method for receiving and amplifying an incoming signal in a receiver comprising:
  determining a mode of operation, wherein in response to determining the mode of operation only one active path, selected from two or more received signals paths within the receiver, is active;
  receiving a received signal;
  selectively routing the received signal to only one active path;
  filtering the received signal with only one active path filter to create a filtered signal;
  generating a bias signal;
  controlling one or more switches to selectively connect the bias signal to only an active path amplifier
  amplifying the filtered signal with an active path amplifier.

16. The method of claim 15, wherein the bias signal is generated by a shared bias circuit which is shared, through the one or more switches, with two or more amplifiers.

17. The method of claim 15, wherein during operation the received signal and filtered signal travel within two or fewer die.

18. The method of claim 15, wherein the mode of operation is determined by a frequency band of the received signal.

19. The method of claim 15, wherein selectively routing the received signal to an active path is performed by an antenna switch.

20. The method of claim 15, wherein the method is performed in a tri-band wireless communication device.

21. The method of claim 15, wherein the selectively route and selectively connect is controlled by one or more control signals from a processor.

* * * * *